Oct. 17, 1961    W. R. CLAYTON ET AL    3,004,570
TREE-CUTTING ATTACHMENT FOR TRACTORS AND THE LIKE
Filed March 27, 1958    3 Sheets-Sheet 1
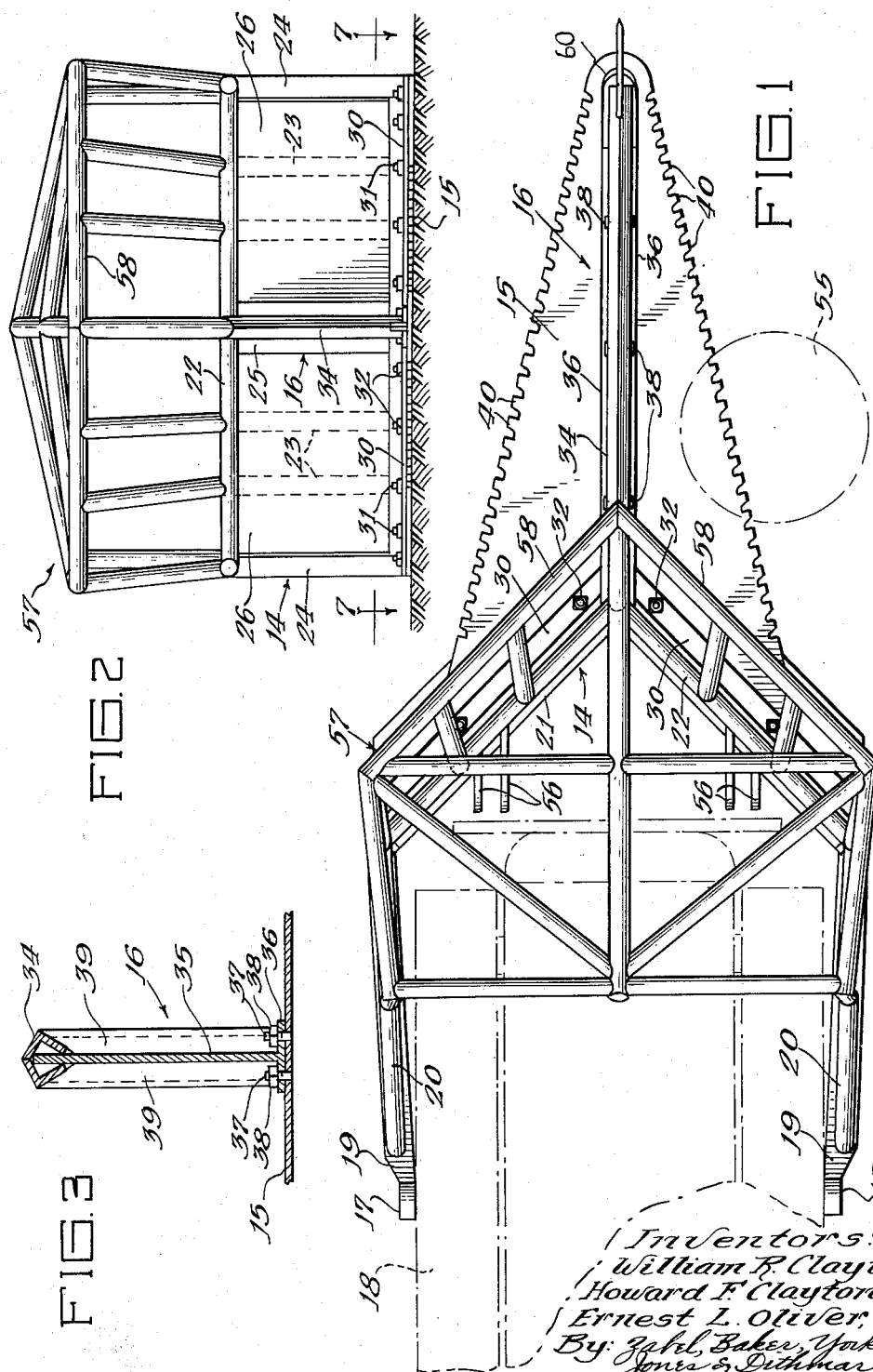
Inventors:
William R. Clayton
Howard F. Clayton, Jr.
Ernest L. Oliver, Jr.
By: Zahl, Baker, York,
Jones & Dithmar
Attorneys Oct. 17, 1961 W. R. CLAYTON ET AL 3,004,570
TREE-CUTTING ATTACHMENT FOR TRACTORS AND THE LIKE
Filed March 27, 1958 3 Sheets-Sheet 2
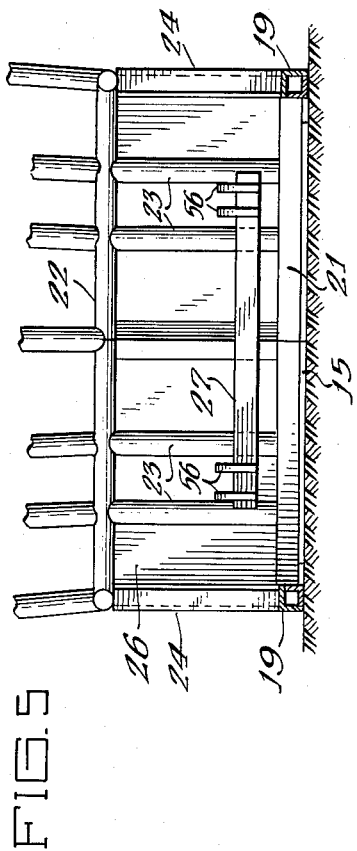
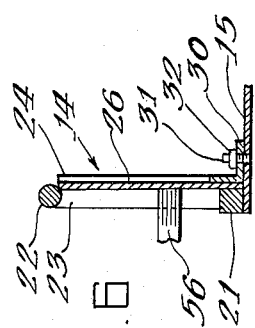
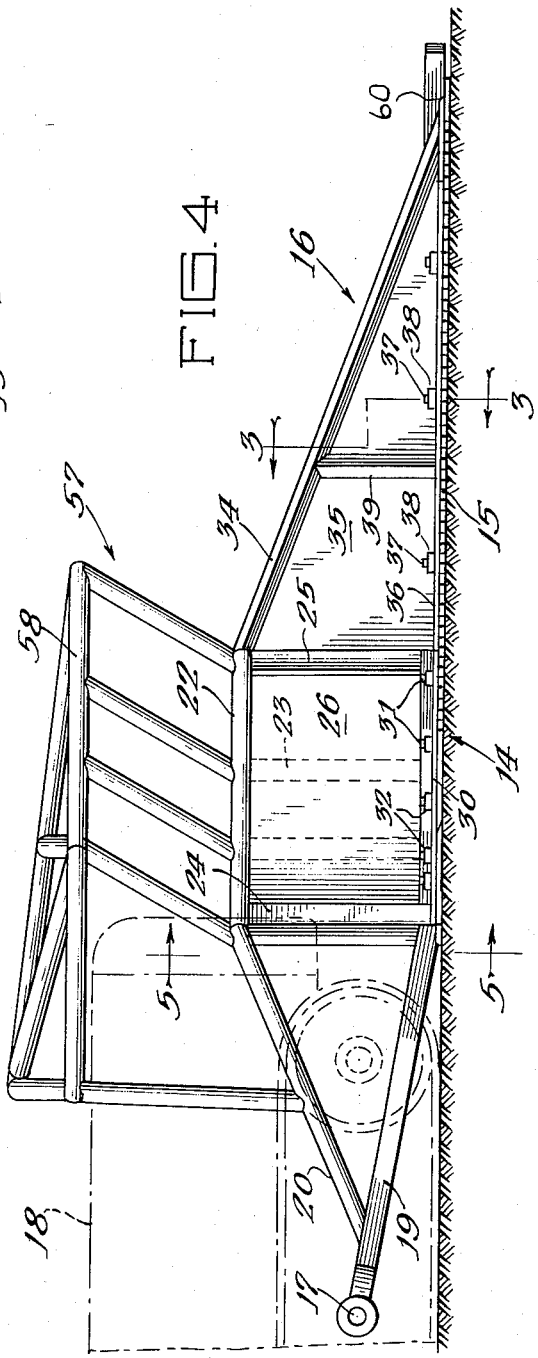
Inventors:
William R. Clayton
Howard F. Clayton, Jr.
Ernest L. Oliver, Jr.
By: Zabel, Baker, York,
Jones & Dithmar
Attorneys

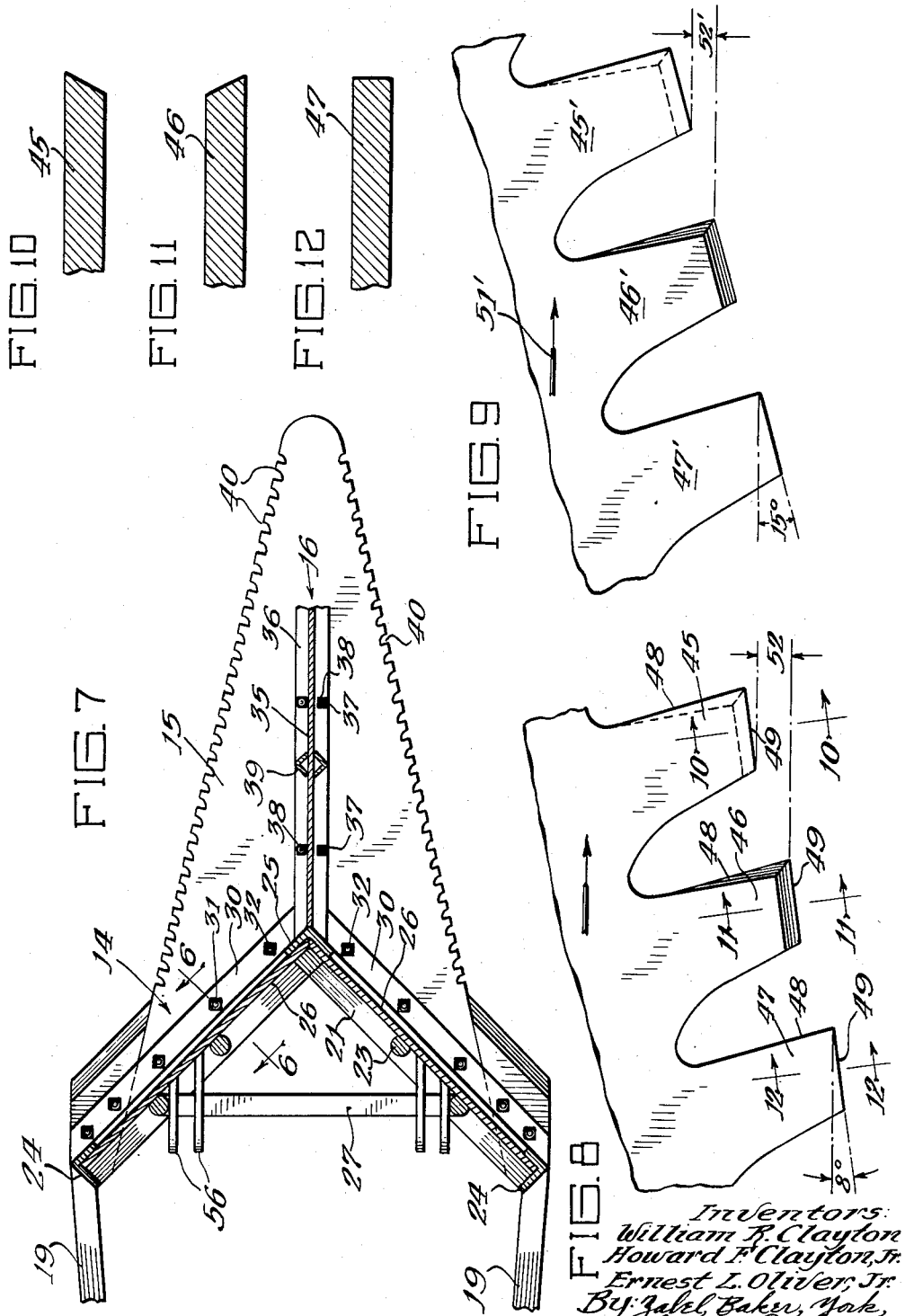

United States Patent Office 3,004,570
Patented Oct. 17, 1961

3,004,570
TREE-CUTTING ATTACHMENT FOR TRACTORS AND THE LIKE
William R. Clayton, P.O. Box 114, Angleton, Tex.; Howard F. Clayton, Jr., 1102 E. Miller, Angleton, Tex.; and Ernest L. Oliver, Jr., Rosharon, Tex.
Filed Mar. 27, 1958, Ser. No. 724,449
6 Claims. (Cl. 144—34)

This invention relates to a heavy duty tree-cutting device for use in land clearance.

An object of this invention is to provide a tree-cutting device having an improved cutting action, and in which the improved cutting action is dependent in part, at least, to the creation of a lateral blade thrust or reaction, as distinguished from certain prior art devices in which the cutting action is attributable primarily to a longitudinal thrust.

Furthermore, in such prior art devices, it has been proposed to attach the saw blade to the front of a tractor for use in cutting trees. However, it has been found that when such devices are used on trees of more than two to four feet in diameter the saw blade buckles and otherwise becomes bent. One of the difficulties involved is that as the depth of cut becomes deeper there is more binding on the saw blade with the result that the time eventually approaches, provided that the tractor is powerful enough to avoid stalling, at which the blade will no longer resist the forces involved and will become bent.

Another object of this invention is to provide in connection with a tree-cutting device, an improved one-piece saw blade which is so mounted that it will withstand the forces involved without buckling, and particularly, the buckling which results from the lateral thrust imposed by the present invention.

A further object is to provide an improved tree-cutting device in which the cutting action or depth of cut per tooth is regulated by the tooth shape. By virtue of such arrangement, a standard device can be made for all sizes of tractors, but the tooth shape will vary in accordance with the particular size of tractor on which the tree-cutting device is to be mounted.

In this connection the teeth are provided with a negative relief angle which causes the blade to be displaced laterally. This throws the tractor to one side or "rides the tractor out." Therefore, this "riding out" is utilized to regulate the depth of cut.

Of course, as the cut becomes deeper and the binding forces increase, the lateral stress on the blade will increase commensurately with the result that, according to the present invention, the one-piece blade and mounting means provided is particularly well suited for use with this type of blade and tooth shape.

A further object is to provide a device of the type indicated in which the blade is readily replaceable.

Other objects and features and advantages will become apparent as the description proceeds.

With reference now to the drawings, in which like reference numerals represent like parts:

FIG. 1 is a plan view of a preferred embodiment of this invention and showing the tractor in broken lines;

FIG. 2 is a front view of the device shown in FIG. 1;

FIG. 3 is a vertical transverse section taken along line 3—3 of FIG. 4;

FIG. 4 is a side elevation of FIG. 1;

FIG. 5 is a vertical transverse section taken along line 5—5 of FIG. 4;

FIG. 6 is a vertical section taken along line 6—6 of FIG. 7;

FIG. 7 is a plan section taken along line 7—7 of FIG. 2;

FIG. 8 is an enlarged view of the blade teeth;

FIG. 9 is a similar view showing a modification; and

FIGS. 10 to 12 are sectional view along lines 10—12 of FIG. 8, showing the shape of the tooth edges.

Referring now to FIGS. 1 and 2, the device comprises a blade base mounting means 14, to which is suitably secured a one-piece saw blade 15, so that the latter is cantilevered out in front of the base mounting means 14, otherwise referred to as the mold board. Blade supporting means 16 project forwardly from the mold board for supporting the blade 15 at its front end and at intermediate points.

The mold board is pivotally secured to the trunnions 17 of a tractor 18 by means of lower thrust members 19 and upper thrust members 20. The lower thrust members are shown as being of rectangular shape and may be formed from boxed angles. The upper thrust members 20 are shown as being of tubular shape and may conveniently be formed from drill pipe.

The mold board 14 is V-shaped, the two halves being substantially identical, and the structure will be described with respect to only one half. Structurally, the mold board comprises a lower horizontal rectangular member 21 and an upper horizontal tubular member 22 as shown in FIG. 6, which are connected by a plurality of intermediate tubular members 23 and a rear vertical member 24, which may be in the form of an angle as shown in FIG. 7. The two halves also include a common vertical member 25 in the form of an angle. To the framework just described is suitably secured a steel mold board plate 26. The two halves of the mold board are also connected by a cross-member 27.

Thus a rigid V-shaped structure is provided which serves as a mounting for the base of the blade 16.

The rear edge of the blade is V-shaped to conform to the shape of the mold board 14. As shown in FIGS. 6 and 7, an angle 30 is secured into the lower edge of the mold board and the blade 15 is secured to the mold board by means of studs 31 and nuts 32 which engage the flange of the angle 30.

The blade supporting member 16 comprises a downwardly and forwardly extending structural member 34 which, as shown in FIG. 3, may be formed of boxed angles. Secured to the member 34 is a vertical web 35, the lower edge of which is provided with a T-flange 36. Thus the blade supporting means is a self-sustaining member which is rigid with respect to vertical forces. The blade 15 is supported therefrom by means of studs 37 and nuts 38 which engage the T-flange 36. The blade supporting means may be provided with one or more vertical reinforcing members 39 at intermediate points.

The blade 15 is a continuous member having teeth 40 formed along each side edge and is preferably formed of ⅝" or ¾" plate of a high alloy steel with Brinell hardness of 321 or more, such as U.S. Corolay T1–321, having a tensile strength of the order of 120,000 lbs. p.s.i. Thus, the blade possesses an inherent rigidity which permits the same to transmit a longitudinal thrust rearwardly from the front to the mounting means or mold board 14, and which permits it to transmit a lateral thrust from one side of the blade to the other and thence to the other side of the mold board.

Although the principal function of the blade supporting means 16 is to suspend the blade and by numerous fastening means, to maintain the same in a plane, it also serves to reinforce the same against buckling, particularly where longitudinal stresses are transmitted the full length of the blade.

The lateral thrust above referred to is developed by the tooth shape as shown in FIGS. 8–12. There are three (3) types of teeth, one type being an under beveled tooth 45, a second type being an upper beveled tooth 46, and the third type being a square-cut tooth 47. This relationship of the three types is shown in FIGS. 10–12, the beveling in the first two types being applied to both the face 48 and the flank 49 of the tooth.

The flank 49 of each tooth is provided with a negative relief angle which engages the bottom of the kerf and causes the tractor to "ride out" as previously indicated.

In FIG. 8 the longitudinal axis of the blade and the general direction of movement thereof is indicated by arrow 51. The depth of cut is determined by the lateral distance between the heel of one tooth and the front edge of the next succeeding tooth and is indicated by the dimension arrows 52.

By comparing FIG. 8 with FIG. 9, it becomes apparent that the depth of cut may be regulated by varying the negative relief angle of the teeth of one blade with respect to the other. For instance, in FIG. 8, a negative relief angle of 8° is provided, whereas in FIG. 9, a negative relief angle of 15° is provided.

The "riding out" of the tractor occasioned by the negative relief angle results in the application of a considerable lateral thrust to the blade 15. When a tree, as indicated by the broken lines 55 in FIG. 1, is being engaged by the wider and more rearward portion of the blade 15, the lateral force is taken up primarily by the point of the mold board as represented by the common vertical angle member 25. When the tree is engaged at a point rearwardly of that shown in FIG. 1, the resultant thrust or reaction is taken up primarily by that half of the mold board which is closest to the tree. In either event, the distance between the tree and the point at which the base of the blade is secured to the mounting means is considerably less than would be the case if the supporting means were not V-shaped. This very substantially minimizes the tendency of the blade to buckle, particularly at the time when the binding action of the tree on the blade is the greatest.

It has been found that the cutting action is materially improved and less horsepower is required if the teeth are not set to one side or the other of the median plane of the blade.

One advantage of the present construction is that a standard mounting device and blade shape may be made for the three principal tractor sizes, such as 80 H.P., 100 H.P. and 150 H.P. The variation in the tree-cutting device furnished, aside from trunnion location, will reside in the clearance angle provided. With a tractor of smaller horsepower, a greater clearance angle will permit cutting action to take place without having tractor stall, or without requiring the operator to shift down into second or first gear.

In operation, the device is suitably connected to the trunnions 17 of the tractor, and then the hydraulic lift or cable lift is connected to the cross-member 27. Generally, two such lifts are provided and the cross-member is reinforced at these points by fins 56, shown in FIGS. 1 and 7. Thus, the angle of elevation of the blade can be regulated.

In normal operation, it is intended that the blade be substantially horizontal so that it actually rests on the ground. Then, the tractor is advanced into a tree so that the front edge of the blade engages the tree, and as the tractor continues its forward movement, the blade will cut into the tree. The space between the tree 55 in FIG. 1, and the edge of the T-flange 36 indicates the approximate extent of "riding out" that will be encountered in a single pass of the blade. Then the tractor may be reversed and the blade withdrawn and another pass made on the opposite side of the tree, and in this case, the opposite cutting edge of the blade would engage the tree.

In the event that a blade becomes bent or otherwise damaged, a new blade can be substituted very quickly by virtue of the stud and nut securing means herein disclosed. In the alternative a weld may be substituted for the studs 31 and nuts 32 which secure the rear edge of the blade 15 to the mold board angle 30, the nature of the weld being such that it may easily be burned off when removing the blade. A light weld is desirably provided at the very front edge 60 of the blade supporting means 16. Similarly a weld may be substituted for the studs 37 and nuts 38 but the latter are preferred at these points because the blade is much easier to remove when the weld is only at the rear edge and front tip than when the weld extends continuously along the longitudinal axis.

The construction shown has been satisfactorily utilized with a blade having an overall length of 15 feet and an overall width of 8 feet. Such a blade, when made in the proportions indicated, will make a cut about 3 feet deep in a tree 8 feet in diameter, on a single pass, when mounted on a 150-H.P. tractor.

A suitable superstructure 57 may be provided to protect the front of the tractor and the operator from the falling tree. The superstructure may be fabricated from welded drill pipe and, preferably, it is canted forwardly somewhat as shown in FIG. 1, so that the horizontal members 58 will serve as pushers to push the tree over at the time that the trunk has been almost severed.

Although only a preferred embodiment of this invention has been shown and described herein, it will be understood that various modifications and changes may be made in the construction shown, without departing from the scope of the invention as pointed out in the appended claims.

We claim:

1. A tree-cutting device comprising a mounting structure, and an elongate blade, said mounting structure including means for securing the same to the trunnions of a tractor, and said blade being tapered in the longitudinal direction and having longitudinally spaced teeth on its side edges provided with negative clearance angles to cause the tractor and device to "ride out," the negative clearance angle being related to the longitudinal spacing of the teeth in such a manner that the heel of one tooth is closer to the longitudinal axis of the blade than the front edge of the next succeeding tooth so that the lateral distance between said heel and said front edge will determine the depth of cut of each tooth, whereby the depth of cut of each tooth is regulated by said negative clearance angle, said mounting structure comprising a V-shaped mounting member, and blade supporting means mounted on the apex of said V-shaped mounting member and extending forwardly therefrom, said blade being secured at its base to said V-shaped mounting member and along its longitudinal axis to said blade supporting means.

2. A tree-cutting device comprising a mounting structure, and a triangularly shaped blade having a base and two sides edges, said mounting structure including means for securing the same to the trunnions of a tractor, longitudinally spaced saw teeth formed on said side edges, said saw teeth being provided with negative clearance angles to cause the tractor and device to "ride out," the negative clearance angle being related to the longitudinal spacing of the teeth in such a manner that the heel of one tooth is closer to the longitudinal axis of the blade than the front edge of the next succeeding tooth so that the lateral distance between said heel and said front edge will determine the depth of cut of each tooth, whereby the depth of cut of each tooth is regulated by said negative clearance angle, and said mounting structure comprising a V-shaped mounting member, and blade supporting means mounted on said V-shaped mounting member and extending forwardly therefrom, said blade being secured at its base to said V-shaped mounting member and at its front end to said blade supporting means.

3. A blade for a tree-cutting device comprising a steel plate having forwardly tapering, oppositely disposed side edges, longitudinally spaced teeth formed in each side edge in order to provide two cutting edges for said blade; there being three types of tooth shape, one type being under-beveled on its face and flank, the second type being upper-beveled on its face and flank, and the third type being square-cut, the flanks of the teeth of all types having a relief angle which is negative with respect to the longitudinal axis of the blade so that when the flanks engage the bottom of the kerf cut in a tree, the blade will be caused to "ride out," the negative relief angle being related to the longitudinal spacing of the teeth in such a manner that the heel of one tooth is closer to the longitudinal axis of the blade than the front edge of the next succeeding tooth so that the lateral distance between said heel and said front edge will determine the depth of cut of each tooth, whereby the depth of cut of each tooth is regulated by said negative relief angle.

4. A blade for a tree-cutting device comprising a unitary triangularly shaped steel plate having forwardly tapering, oppositely disposed side edges, longitudinally spaced teeth formed in each side edge in order to provide two cutting edges for said blade, the flanks of said teeth having a relief angle which is negative with respect to the longitudinal axis of the blade so that when the flanks engage the bottom of the kerf cut in a tree, the blade will be caused to "ride out," the negative relief angle being related to the longitudinal spacing of the teeth in such a manner that the heel of one tooth is closer to the longitudinal axis of the blade than the front edge of the next succeeding tooth so that the lateral distance between said heel and said front edge will determine the depth of cut of each tooth, whereby the depth of cut of each tooth is regulated by said negative relief angle.

5. A blade for a tree-cutting device comprising a steel plate having forwardly tapering, opposite side edges disposed at a substantially 30° angle to each other, longitudinally spaced teeth formed in each side edge in order to provide two cutting edges for said blade, there being two types of tooth shape, one type being beveled on its face and flank, and the second type being squarecut, the flanks of the teeth of both types having a relief angle which is negative with respect to the longitudinal axis of the blade so that when the flanks engage the bottom of the kerf cut in a tree, the blade will be caused to "ride out," the negative relief angle being related to the longitudinal spacing of the teeth in such a manner that the heel of one tooth is closer to the longitudinal axis of the blade than the front edge of the next succeeding tooth so that the lateral distance between said heel and said front edge will determine the depth of cut of each tooth, whereby the depth of cut of each tooth is regulated by said negative relief angle.

6. In a tree-cutting device for mounting on a tractor, the combination of a V-shaped blade base mounting means, a blade supporting member extending forwardly from the apex thereof, blade means having two oppositely disposed, tapering cutting edges tapered in the direction of tractor movement, said cutting edges being provided with longitudinally spaced teeth, the flanks of said teeth having a relief angle which is negative with respect to the longitudinal axis of the blade so that the engagement of the flanks with the bottom of the kerf cut in a tree will cause the tractor and tree cutting device to "ride out," the negative relief angle being related to the longitudinal spacing of the teeth in such a manner that the heel of one tooth is closer to the longitudinal axis of the blade than the front edge of the next succeeding tooth so that the lateral distance between said heel and said front edge will determine the depth of cut of each tooth, whereby the depth of cut of each tooth is regulated by said negative relief angle, means for removably securing the base of said blade means to said V-shaped mounting means, a longitudinally extending flange on said blade supporting means, and means for removably securing said blade to the under surface of said flange so that a single plate member can be utilized for said blade means.

References Cited in the file of this patent

UNITED STATES PATENTS

| Number | Name | Date |
|---|---|---|
| 81,413 | Sattler | Aug. 25, 1868 |
| 336,380 | Bertram | Feb. 16, 1886 |
| 835,226 | Oakes | Nov. 6, 1906 |
| 956,768 | Javer | May 3, 1910 |
| 1,107,535 | Martin | Aug. 18, 1914 |
| 2,158,541 | Horstmann | May 16, 1939 |
| 2,309,223 | Staring | Jan. 26, 1943 |
| 2,512,666 | Meske | June 27, 1950 |
| 2,633,880 | Mattson | Apr. 7, 1953 |
| 2,650,628 | Long | Sept. 1, 1953 |
| 2,821,217 | Shald | Jan. 28, 1958 |